United States Patent [19]

Iwahashi

[11] Patent Number: 5,201,070
[45] Date of Patent: Apr. 6, 1993

[54] RADIO COMMUNICATION APPARATUS COMPRISING A SINGLE LEVEL CONTROLLER

[75] Inventor: Koji Iwahashi, Tokyo, Japan

[73] Assignee: NEC Corporation, Japan

[21] Appl. No.: 512,661

[22] Filed: Apr. 20, 1990

[30] Foreign Application Priority Data

Apr. 20, 1989 [JP] Japan .................................. 1-100614

[51] Int. Cl.$^5$ ............................ H04B 1/02; H04B 7/00
[52] U.S. Cl. .................................. 455/91; 455/234.1; 455/246.1
[58] Field of Search .................. 455/89, 115–116, 455/127, 234, 236, 246, 247, 249, 103, 91, 234.1, 234.2, 236.1, 246.1, 247.1, 249.1; 379/61–62

[56] References Cited

U.S. PATENT DOCUMENTS

| | | | |
|---|---|---|---|
| 4,194,154 | 3/1980 | Kahn | 455/103 |
| 4,271,503 | 6/1981 | Eumurian et al. | 455/234 |
| 4,870,699 | 9/1989 | Garner et al. | 455/76 |

Primary Examiner—Reinhard J. Eisenzopf
Assistant Examiner—Andrew Faile
Attorney, Agent, or Firm—Ostrolenk, Faber, Gerb & Soffen

[57] ABSTRACT

A radio communication apparatus includes a transmitting portion supplied with input baseband signals for selectively transmitting the input baseband signals in response to a selection signal. The transmitting portion includes a selector for selecting one of the input baseband signals as a selected baseband signal in response to the selection signal. A level controller has a controllable gain and controls the selected baseband signal so that the selected baseband signal has a level which is determined by the controllable gain. A gain controller has predetermined gains in correspondence to the input baseband signals and controls the controllable gain in response to the selection signal so that the controllable gain becomes equal to one of the predetermined gains that corresponds to the selected baseband signal. A converter converts the selected baseband signal into a radio signal carrying the selected baseband signal. The gain controller may have a memory for memorizing the predetermined gains. Responsive to the selection signal, a reading circuit reads from the memory, as a read-out gain, one of the predetermined gains that corresponds to the selected baseband signal. A control circuit controls the controllable gain so that the controllable gain becomes equal to the read-out gain.

4 Claims, 6 Drawing Sheets

RADIO COMMUNICATION APPARATUS COMPRISING A SINGLE LEVEL CONTROLLER

BACKGROUND OF THE INVENTION

This invention relates to a radio communication apparatus which has a plurality of input terminals supplied with a plurality of input baseband signals.

A radio communication apparatus of the type described, comprises a transmitting portion which is connected to the input terminals. The transmitting portion selectively transmits the input baseband signals in response to a selection signal.

As will later be described, a transmitting portion of a conventional radio communication apparatus comprises a plurality of level controllers which have a plurality of fixed gains, respectively, and which are connected to the input terminals, respectively. Each of the level controllers controls the input baseband signal in question so that the input baseband signal has an optimum level.

A plurality of switches are connected to the level controllers, respectively. Each of the switches produces, as an output signal thereof, the input baseband signal only when the switch under consideration is put into an on state. Responsive to the selection signal, a switch controller controls the switches to put one of the switches into the on state. This one of the switches corresponds to the baseband input signal which is indicated by the selection signal. Connected to the switches, an adder adds output signals of the switches together and produces an added signal.

A baseband processor carries out a baseband processing of the added signal to produce a processed signal. For example, the baseband processor carries out a band restriction processing of the added signal, namely, a band-pass filtering processing of the added signal. A modulator modulates the processed signal into a modulated signal. A radio frequency amplifier amplifies the modulated signal as a radio signal which is transmitted from an antenna.

With this structure, the level controller must deal with each of the input baseband signals. Therefore, the number of the level controllers increases as the number of the input baseband signals increases.

SUMMARY OF THE INVENTION

It is therefore an object of this invention to provide a radio communication apparatus which has a simple structure.

It is another object of this invention to provide a radio communication apparatus of the type described, which is small in size.

It is still another object of this invention to provide a radio communication apparatus of the type described, which has a low cost.

Other objects of this invention will become clear as the description proceeds.

On describing the gist of this invention, it is possible to understand that a radio communication arraratus has a plurality of input terminals supplied with a plurality of input baseband signals and transmitting means connected to the input baseband terminals for selectively transmitting the baseband input signals in response to a selection signal.

According to this invention, the transmitting means comprises in the above-understood radio communication apparatus: selecting means connected to the input terminals and responsive to the selection signal for selecting one of the input baseband signals as a selected input signal; level controlling means having a controllable gain and connected to the selecting means for controlling the selected baseband signal so that the selected baseband signal has a level which is determined by said controllable gain; gain controlling means connected to the level controlling means and having a plurality of predetermined gains in correspondence to the input baseband signals and responsive to said selection signal for controlling the controllable gain so that the controllable gain becomes equal to one of the predetermined gains that corresponds to the selected baseband signal; and converting means connnected to the level controlling means for converting the selected baseband signal into a radio signal which carries the selected baseband signal.

DESCRIPTION OF THE PREFERRED EMBODIMENTS

Figure 1:
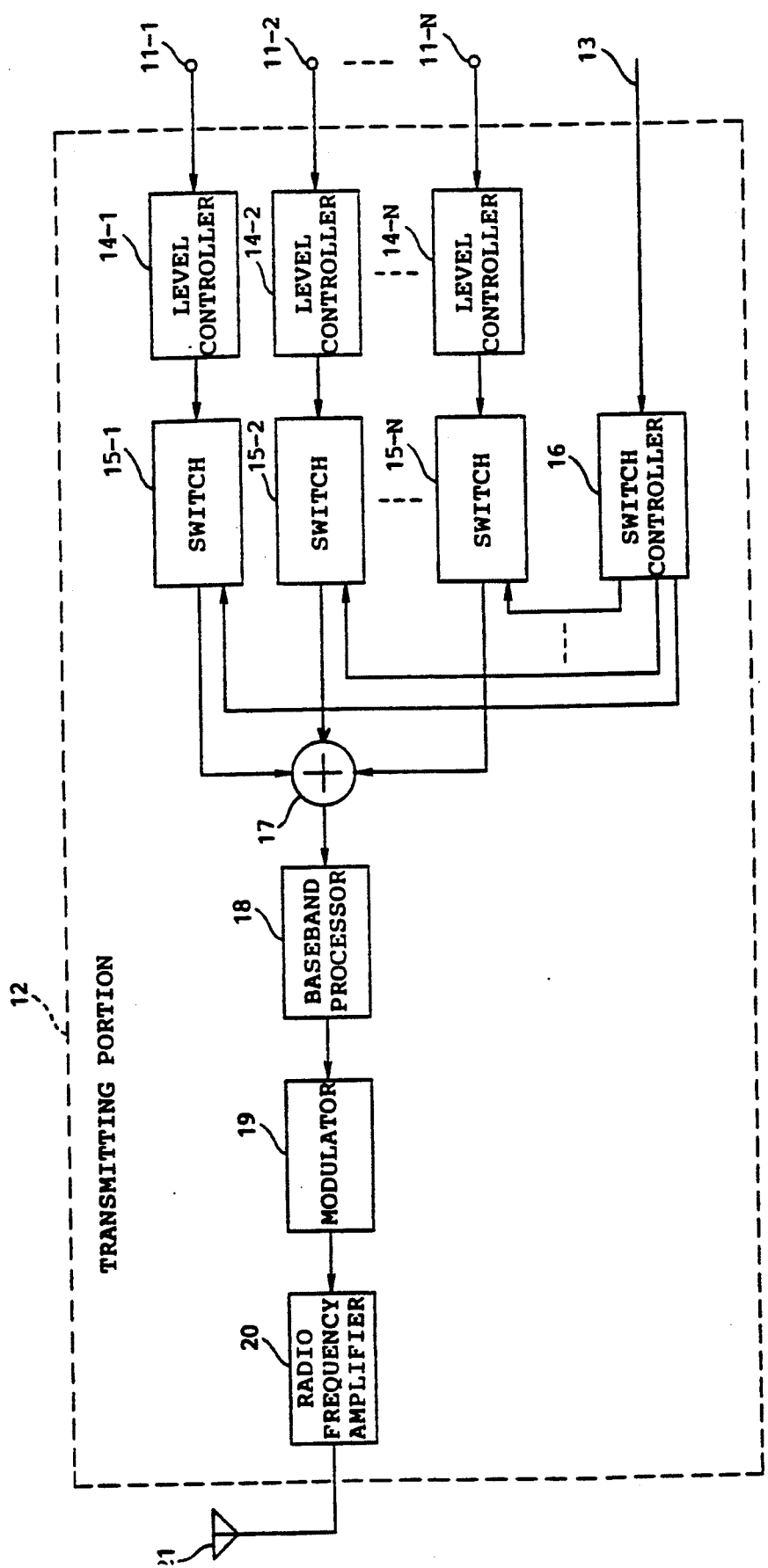
FIG. 1 Is a block diagram of a conventional radio communication apparatus.

Referring to FIG. 1, a conventional radio communication apparatus will be described at first for a better understanding of this invention. The conventional radio communication apparatus is equivalent to a radio communication apparatus which is described in the preamble of the instant specification.

The conventional radio communication apparatus has first through N-th input terminals 11-1, 11-2, . . . , and 11-N supplied with first through N-th input baseband signals, where N represents a predetermined integer greater than one. A transmitting portion 12 is connected to the input baseband terminals 11 (suffixes omitted). The transmitting portion selectively transmits the baseband input signals in response to a selection signal 13.

The transmitting portion comprises first through N-th level controllers 14-1, 14-2, . . . , and 14-N which have first through N-th predetermined gains, respectively, and which are connected to the first through the N-th input terminals 11, respectively. The first and the second level controllers 14-1 and 14-2 control the first and the second input baseband signals, respectively, so that the first and the second input baseband signals have first and second optimum levels, respectively. Likewise, the N-th level controller 14-N controls the N-th input baseband signal so that the N-th input baseband signal has an N-th optimum level.

First through N-th switches 15-1, 15-2, . . . , and 15-N are connected to the first through the N-th controllers 14 (suffixes omitted), respectively. When each of the first through the N-th switches 15 (suffixes omitted) is put into an on state, the switch in question produces, as an output signal thereof, the input baseband signal in question as it is. When the switch in question is put into an off state, the switch in question produces no input baseband signal.

A switch controller 16 is connected to the switches 15. Responsive to the selection signal 13, the switch controller 16 controls the switches 15 to put one of the switches 15 into the on state. This one of the switches 15 corresponds to the input baseband signal which is indicated by the selection signal 13. Connected to the switches 15, an adder 17 adds the output signals of the switches 15 together and produces an added signal.

Connected to the adder 17, a baseband processor 18 carries out a baseband processing of the added signal. The baseband processing is, for example, a band-pass filtering operation of the added signal. The baseband processor 18 thereby produces a processed signal. A modulator 19 is connected to the baseband processor 18 to modulate a radio frequency signal with the processed signal to produce a modulated radio frequency signal. A radio frequency amplifier 20 is connected to the modulator 19 to amplify the modulated radio frequency signal into an amplified radio frequency signal. The amplified radio frequency signal is transmitted from an antenna 21.

In the radio communication apparatus, it is necessary to prepare the level controller 14 for each of the input baseband signals. Therefore, the number of the level controllers 14 increases with an increase of the baseband input signals as described in the preamble of the instant specification.

Figure 2:
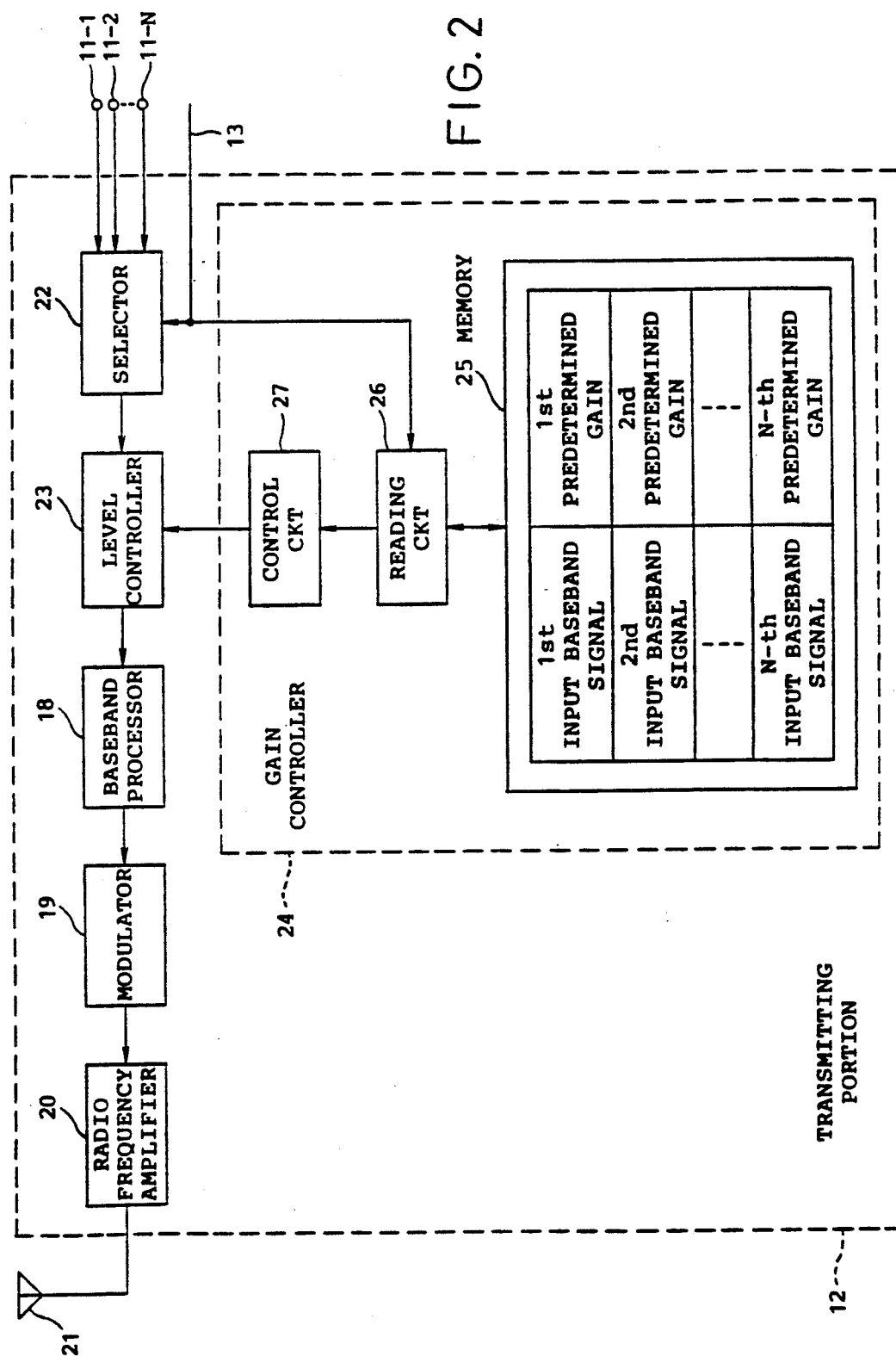
FIG. 2 is a block diagram of a radio communication apparatus according to a first embodiment of this invention.

Referring to FIG. 2, a radio communication apparatus according to a first embodiment of this invention comprises similar parts designated by like reference numerals. In the radio communication apparatus, the transmitting portion 12 comprises a selector 22 connected to the first through the N-th input terminals 11. Responsive to the selection signal 13, the selector 22 selects one of the first through the N-th input baseband signals as a selected baseband signal.

A level controller 23 has a controllable gain and is connected to the selector 22. The level controller 23 controls the selected baseband signal so that the selected input signal has a level which is determined by the controllable gain. The level controller 23 may be an amplifier having an amplification factor variable above and below unity.

A gain controller 24 is implemented by a CPU (central processing unit). The gain controller 24 is connected to the level controller 23 and has first through N-th predetermined gains in correspondence to the first through the N-th input baseband signals. Responsive to the selection signal 13, the gain controller 24 controls the controllable gain so that the controllable gain becomes equal to one of the first through the N-th predetermined gains. The above-mentioned one of the first through the N-th predetermined gains corresponds to the selected baseband signal.

More specifically, the gain controller 24 comprises a memory 25 which memorizes the first through the N-th predetermined gains in correspondence to the first through the N-th input baseband signals. A reading circuit 26 is connected to the memory 25. Responsive to the selection signal 13, the reading circuit 26 reads from the memory 25, as a read-out gain, one of the first through the N-th predetermined gains that corresponds to the selected baseband signal. Connected to the reading circuit 26 and to the level controller 23, a control circuit 27 controls the controllable gain so that the controllable gain becomes equal to the read-out gain.

Summarizing, the level controller 23 is for level controlling the selected baseband signal in response to a gain control signal associated with the selected baseband signal. The gain control signal is produced by the control circuit 27 of the gain controller 24.

Connected to the level controller 23, the baseband processor 18 carries out a baseband processing of the selected baseband signal. For example, the baseband processor 18 carries out a band restriction processing, namely, a band-pass filtering processing like in the baseband processor 18 of the conventional radio communication apparatus illustrated in FIG. 1. The baseband processor 18 thereby produces a processed signal.

Each of the modulator 19 and the radio frequency amplifier 20 operates in the manner described in conjuction with FIG. 1. Thus, a combination of the baseband processor 18, the modulator 19, and the radio frequency amplifier 20 acts as a converter connected to the level controller 23. The converter converts the selected baseband signal into a radio signal. The radio signal carries or conveys the selected baseband signal.

With this structure, it is possible to deal with all of the baseband input signals by the use of a single level controller 23. Thus, the radio communication apparatus has a simple structure. That is, the radio communication apparatus is small in size and is produced at a low cost.

Figure 3:
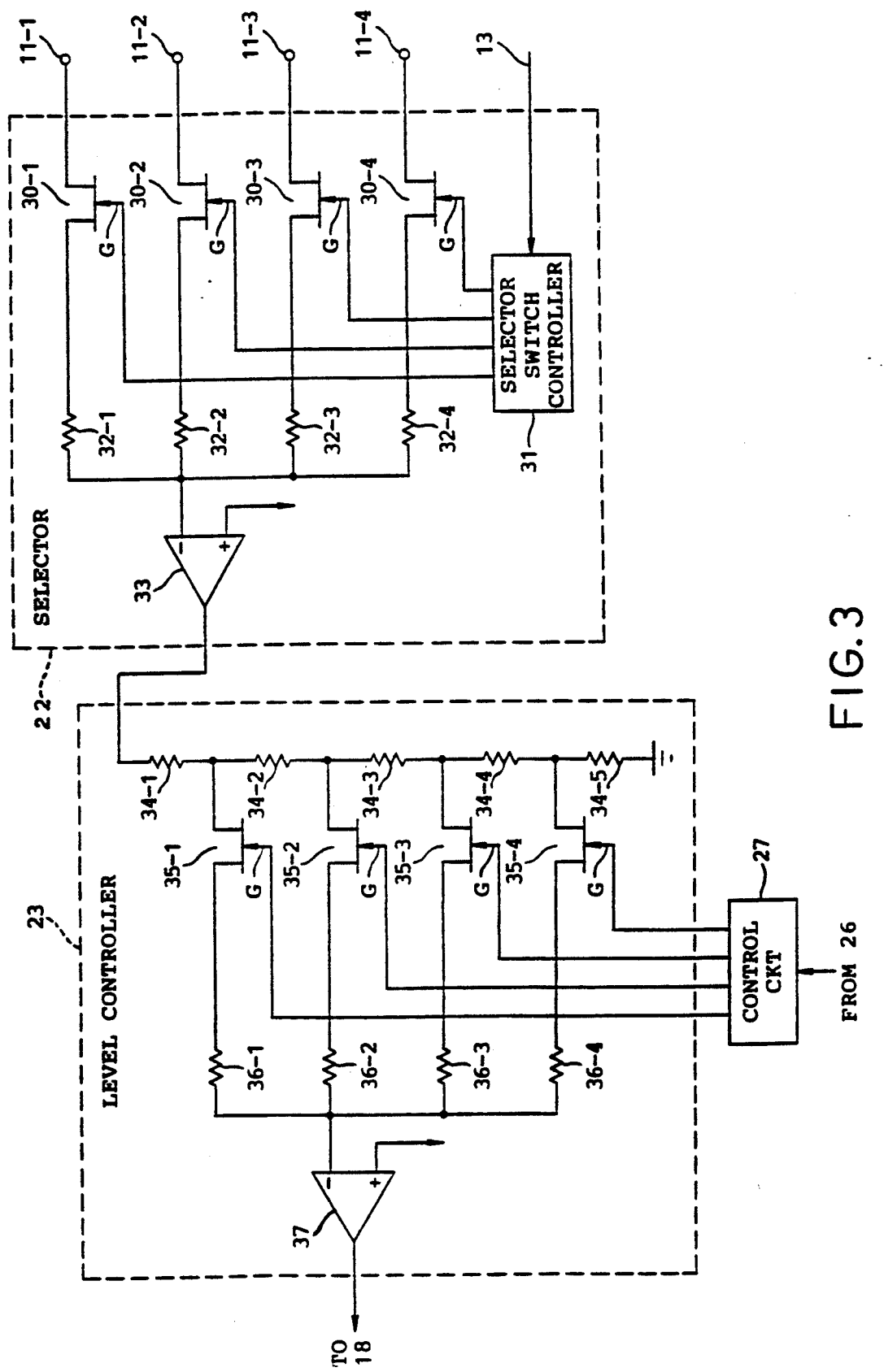
FIG. 3 is a block diagram of a selector, a level controller, and a control circuit of the radio communication apparatus illustrated in FIG. 2.

Referring to FIG. 3, description will proceed to the selector 22 and the level controller 23 of the radio communication apparatus illustrated in FIG. 2. In the illustrated example, the predetermined integer N is equal to four.

The selector 22 comprises first through fourth selector switches 30-1, 30-2, 30-3, and 30-4 which are connected to the first through the fourth input terminals 11-1 to 11-4, respectively. When the first selector switch 30-1 is put into an on state, the first selector switch 30-1 produces, as an output signal thereof, the first input baseband signal as it is. When the first selector switch 30-1 is put into an off state, the first selector switch 30-1 produces no input baseband signal. Each of the second through the fourth selector switches 30-2 to 30-4 operates in the manner similar to the first selector switch 30-1.

In the illustrated example, each of the first through the fourth selector switches 30 (suffixes omitted) is an FET (field effect transistor) having a gate electrode designated by G. For example, the FET 30-1 is put into the on state when the gate electrode G of the FET 30-1 is supplied with a voltage of a high level. When the gate electrode G of the FET 30-1 is supplied with another voltage of a low level, the FET 30-1 is put into the off state. The FET's 30-2 to 30-4 are similar in operation to the FET 30-1.

A selector switch controller 31 is connected to the first through the fourth selector switches 30. Responsive to the selection signal 13, the selector switch controller 31 controls the selector switches 30 to put one of the selector switches 30 into the on state. This one of the selector switches 30 corresponds to the input baseband signal which is indicated by the selection signal 13. A selector operational amplifier 33 has an amplifier output terminal and is connected to the first through the fourth selector switches 30 through first through fourth selector resistors 32-1 to 32-4. The selector operational amplifier 33 amplifies a resultant of the output signals of the first through the fourth selector switches 30 to produce an amplified signal as the selected baseband signal. The selected baseband signal is supplied to the amplifier output terminal.

The level controller 23 comprises first through fifth level controlling resistors 34-1, 34-2, 34-3, 34-4, and 34-5. The first and the second level controlling resistors 34-1 and 34-2 are connected to each other at a first point of connection. The second and the third level controlling resistors 34-2 and 34-3 are connected to each other at a second point of connection. The third and the fourth level controlling resistors 34-3 and 34-4 are connected to each other at a third point of connection. The fourth and the fifth level controlling resistors 34-4 and 34-5 are connected to each other at a fourth point of connection. Thus, the first through the fifth level controlling resistors 34 (suffixes omitted) are connected in series. The amplifier output terminal of the selector operational amplifier 33 is connected to the ground through the first through the fourth level controlling resistors 34. Thus, a combination of the first through the fifth level controlling resistors 34 serves as a resistive divider. As is known in the art, the resistive divider divides a voltage of the selected baseband signal of the amplifier output terminal into first through fourth divided voltages which are given to the first through the fourth points of connection, respectively.

First through fourth level controlling switches 35-1, 35-2, 35-3, and 35-4 are connected to the first through the fourth points of connection, respectively. Each of the level controlling switches 35 (suffixes omitted) is an FET like each of the selector switches 30 and is similar in operation to each of the selector switches 30. When the first level controlling switch 35-1 is put into an on state, the first level controlling switch 35-1 produces, as an output signal thereof, the selected baseband signal as it is. When the first level controlling switch 35-1 is put into an off state, the first level controlling switch 35-1 produces no selected baseband signal. Each of the second through the fourth level controlling switches 35-2 to 35-4 operates in the manner similar to the first level controlling switch 35-1.

The control circuit 27 controls the level controlling switches 35 (suffixes omitted) to put one of the level controlling switches 35 into the on state in the manner which will later be described.

Connected to the first through the fourth level controlling switches 35 through first through fourth controller resistors 36-1, 36-2, 36-3, and 36-4, a level controlling amplifier 37 amplifies a resultant of output signals of the first through the fourth level controlling switches 35 to produce an amplified signal as a level controller output signal.

With this structure, the level controller 23 has a controllable gain which is controlled by the control circuit 27. The controllable gain is given by a combination of the resistive divider, the level controlling switches 35, and the level controlling resistors 36 as a ratio of an output voltage of the level controller 23 to an input voltage of the level controller 23. That is, the level controller 23 controls the selected baseband signal (namely, an input signal of the level controller 23) so that the selected baseband signal has a level which is determined by the controllable gain. The control circuit 27 controls the controllable gain so that the controllable gain becomes equal to the read-out gain which is read out of the memory 25.

The memory 25 (FIG. 2) may memorize, in correspondence to the input baseband signals, switch codes of the level controlling switches 35 which should be put into the on state. In this case, the reading circuit 26 reads from the memory 25 in response to the selection signal 13, as a read-out code, one of the switch codes that corresponds to the selected baseband signal. The control circuit 27 controls the controlling switches 35 so that the controlling switch 35 having the read-out code is put into the on state.

Figure 4:
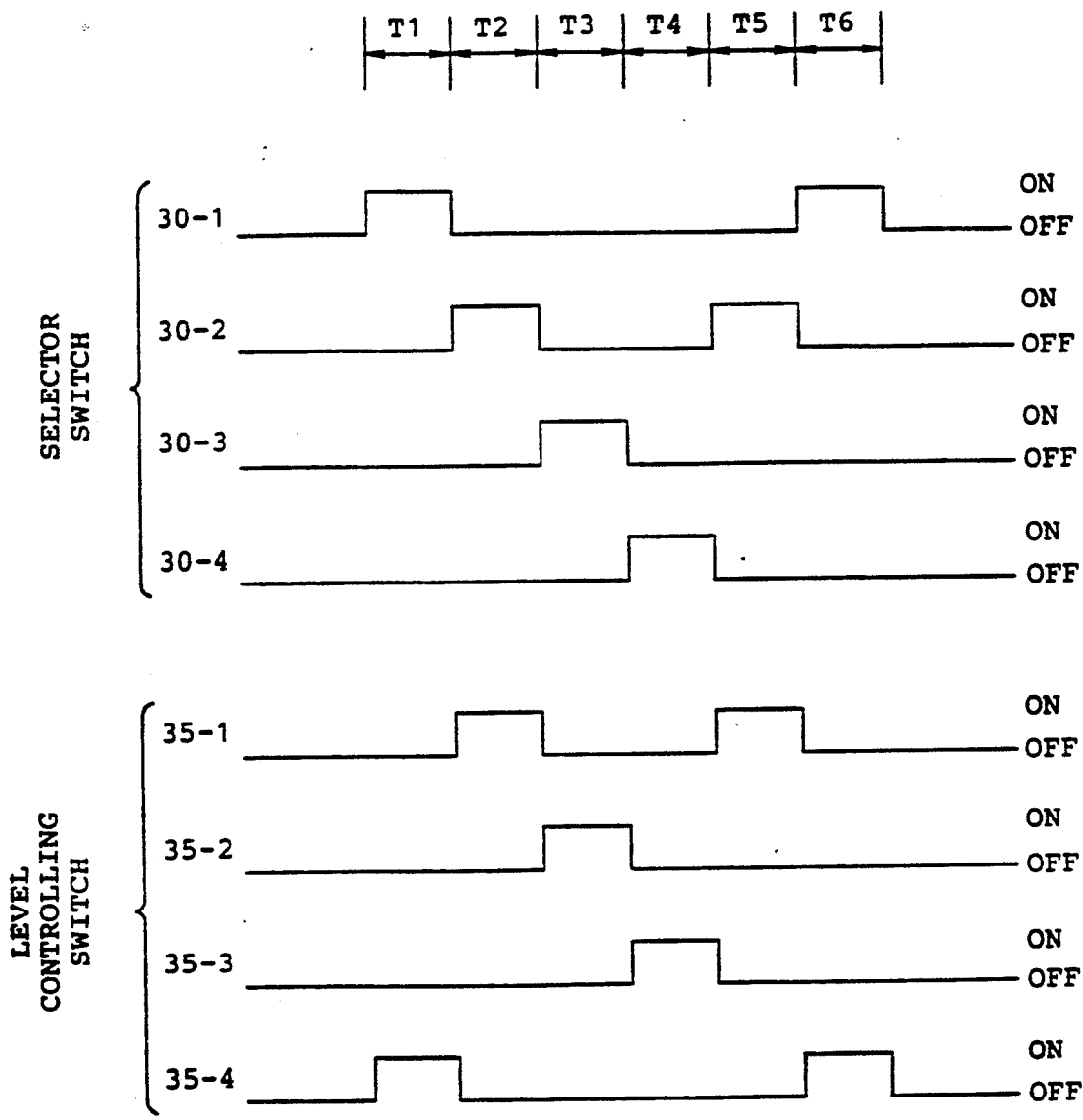
FIG. 4 is a time chart for use in describing operation of the radio communication apparatus illustrated in FIG. 2.

Turning to FIGS. 2 and 4 with reference to FIG. 3 continued, description will proceed to controlling operation of the selector 22 and the level controller 23. It will be assumed that the first input terminal 11-1 is supplied with a control signal as the first input baseband signal. The control signal is, for example, a communication start control signal and a communication end control signal. The communication start control signal is produced by the radio communication apparatus of FIG. 2 and is for use in controlling a start of communication with a base station (not shown). The communication end control signal is produced also by the radio communication apparatus and is for use in controlling an end of the communication.

The second input terminal 11-2 is supplied with a first audio or speech signal as the second input baseband signal. The first speech signal is produced by a handset (not shown) of the radio communication apparatus. The third input terminal 11-3 is supplied with a second audio or speech signal as the third input baseband signal. The second speech signal is produced by a microphone (not shown) of the radio communication apparatus.

The fourth input terminal 11-4 is supplied with a data signal as the fourth input baseband signal. The data signal is produced as a tone signal by depressing one of keys of a keyboard of the handset on communicating with the base station. The tone signal has a frequency which is determined by one of the keys that is depressed.

It will furthermore be assumed that the control signal is delivered from the first input terminal 11-1 to the baseband processor 18 through the fourth level controlling switch 35-4 and that the first speech signal is delivered from the second input terminal 11-2 to the baseband processor 18 through the first level controlling switch 35-1. It will also be assumed that the second speech signal is delivered from the third input terminal 11-3 to the baseband processor 18 through the second level controlling switch 35-2 and that the data signal is delivered from the fourth input terminal 11-4 to the baseband processor 18 through the third level controlling switch 35-3.

Supposing that the communication start control signal is supplied to the first terminal 11-1 at a first time interval T1, the selector switch controller 31 controls the selector switches 30 in response to the selection signal 13 to put only the first selector switch 30-1 into the on state. Simultaneously, the control circuit 27 controls the level controlling switches 35 to put only the fourth level controlling switch 35-4 into the on state. As a result, the communication start control signal is transmitted from the communication apparatus to the base station. Thereafter, the radio communication apparatus is put into a speech signal communication state in which the radio communication apparatus transmits the first and the second speech signals and the data signal in the following manner.

Presuming that the first speech signal is supplied to the second input terminal 11-2 at a second time interval T2, the selector switch controller 31 controls the selector switches 30 in response to the selection signal 13 to put only the second selector switch 30-2 into the on state. At the same time, the control circuit 27 controls the level controlling switches 35 to put only the first level controlling switch 35-1 into the on state. The first speech signal is thereby transmitted from the radio communication apparatus to the base station.

When the second speech signal is supplied to the third input terminal 11-3 at a third time interval T3, the third selector switch 30-3 and the second level controlling switch 35-2 are put into the on state. As a result, the second speech signal is transmitted from the communication apparatus to the base station.

It will be assumed that the data signal is supplied to the fourth input terminal 11-4 at a fourth time interval T4. In this case, the fourth selector switch 30-4 and the third level controlling switch 35-3 are put into the on state. Thus, the second speech signal is transmitted from the communication apparatus to the base station.

When the first speech signal is again supplied to the second input terminal 11-2 at a fifth time interval T5, the second selector switch 30-2 and the first level controlling switch 35-1 are put into the on state. The first speech signal is thereby transmitted from the communication apparatus to the base station.

When the communication end control signal is supplied to the first terminal 11-1 at a sixth time interval T6, the first selector switch 30-1 and the fourth level controlling switch 35-4 is put into the on state. As a result, the communication end control signal is transmitted from the communication apparatus to the base station. Thus, the radio communication apparatus comes to an end of communication with the base station.

Figure 5:
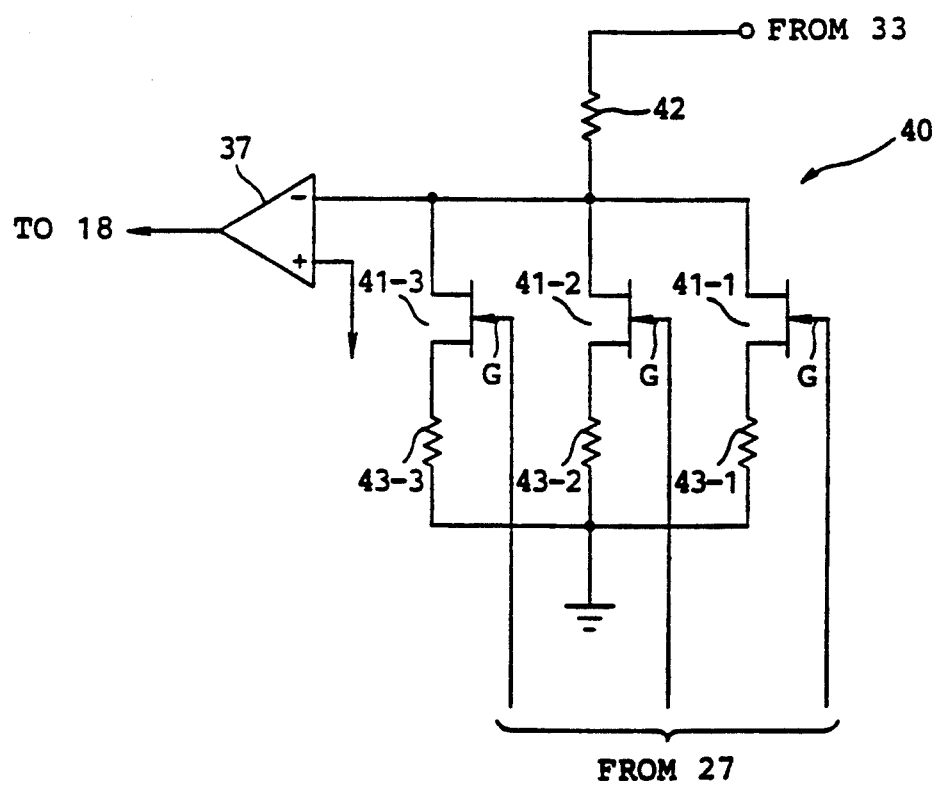
FIG. 5 is a block diagram of another level controller which may be used instead of the level controller illustrated in FIG. 3.

Turning to FIG. 5, description will proceed to another level controller 40 which may be used instead of the level controller 23 illustrated in FIG. 3. The level controller 40 comprises first through third level controlling switches 41-1, 41-2, and 41-3 connected to the selector operational amplifier 33 through a resistor 42. Each of the level controlling switches 41 (suffixes omitted) is an FET like each of the level controlling switches 35 illustrated in FIG. 3. The level controlling switches 41 are connected to the ground through first through third level controlling resistors 43-1, 43-2, and 43-3, respectively. The level controlling amplifier 37 is connected to a particular connection point at which the resistor 42 and each of the level controlling switches 41 are connected to one another.

The level controlling switches 41 are controlled by the control circuit 27 so that at least one of the level controlling switches 41 is put into an on state. In this case, it is possible to obtain seven kinds of combined resistances between the particular connection point and the ground under control of the control circuit 27. The seven kinds of the combined resistances are given by only the resistor 43-1, by only the resistor 43-2, by only the resistor 43-3, by a combination of the resistors 43-1 and 43-2, by another combination of the resistors 43-2 and 43-3, by a still another combination of the resistors 43-1 and 43-3, and by a yet another combination of the resistors 43-1, 43-2, and 43-3. It is therefore possible to obtain seven kinds of voltage level at the particular connection point.

Figure 6:
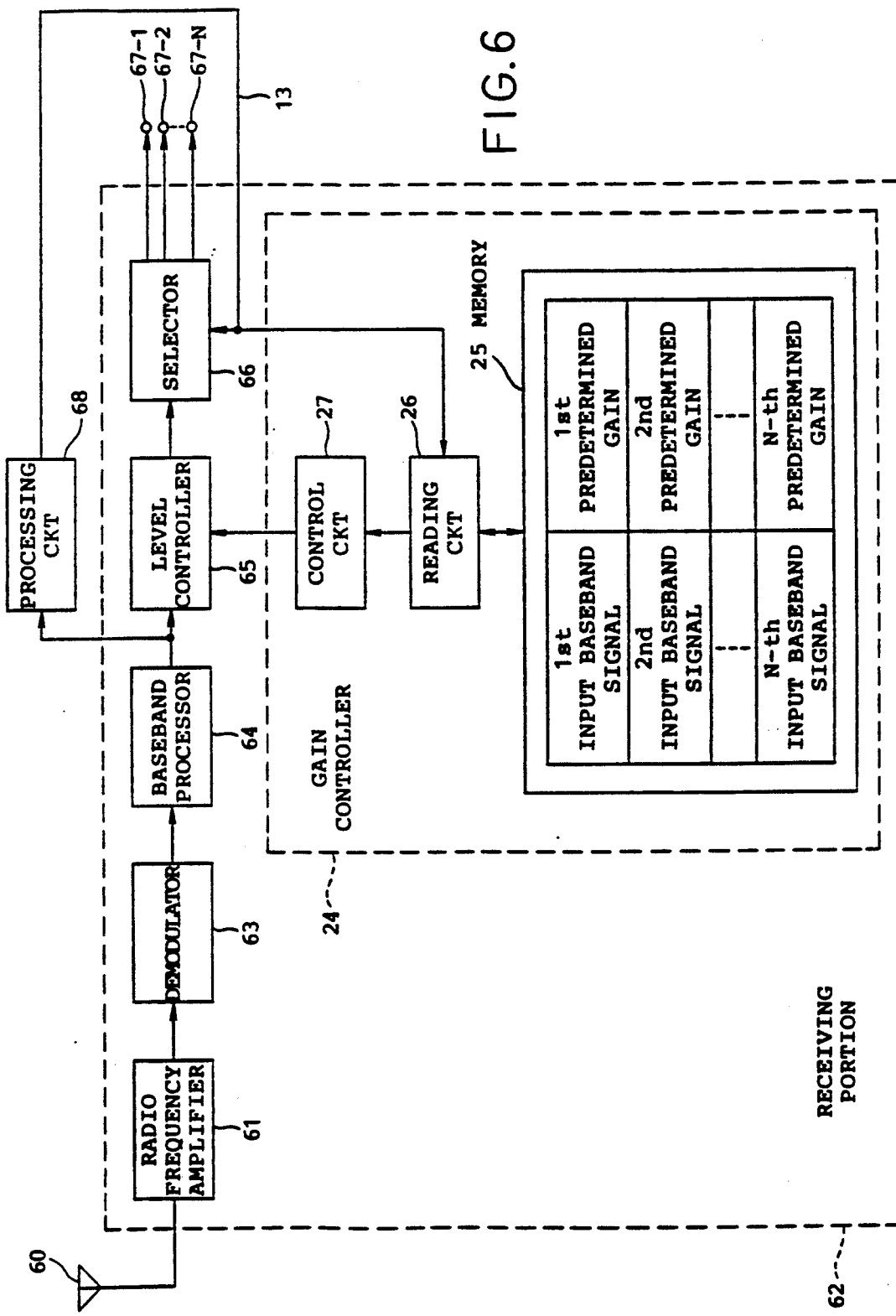
FIG. 6 is a block diagram of a radio communication apparatus according to a second embodiment of this invention.

Turning to FIG. 6, a radio communication apparatus according to a second embodiment of this invention comprises similar parts designated by like reference numerals. In FIG. 6, an antenna 60 picks up a radio frequency (RF) signal and supplies the RF signal to an RF amplifier 61 of a receiving portion 62. The amplifier 61 amplifies the RF signal and supplies the amplified RF signal to a demodulator 63. The demodulator 63 frequency converts the amplified RF signal into an intermediate frequency (IF) signal and demodulates the IF signal to produce a baseband signal. The demodulator 63 supplies the baseband signal to a baseband processor 64 at which the baseband signal is processed, e.g., bandpass filtered. The processor 64 provides processed baseband signals to a level controller 65 which may be composed of the level controller 23 shown in FIG. 2. In response to a gain control signal produced by a gain controller 24, the level controller 65 level controls the baseband signals. The gain controller 24 has the same structure as that shown in FIG. 2.

The level controller 65 supplies the level-controlled baseband signals to a selector 66 which selects one of a plurality of terminals 67-1, 67-2, . . . , and 67-N as a selected terminal in response to a selection signal 13, and supplies one of the baseband signals to the selected terminal. The selector 66 is similar in structure to the selector 22 of FIG. 3 except that the amplifier 33 is eliminated and that input and output terminals of the selector 22 are reversed. The selection signal 13 is provided from a processing circuit 68 to which the processed baseband signals are supplied from the baseband processor 64. The processing circuit 68 processes the processed baseband signals into the selection signal 13. More specifically, the processing circuit 68 detects the communication start control signal and the communication end control signal and, in response to these signals, produces and supplies the selection signal 13 to the selector 66 and the gain controller 24.

While this invention has thus far been described in conjunction with two preferred embodiments thereof, it will readily be possible for those skilled in the art to put this invention into practice in various other manners. For example, the level controller 23 of the radio communication apparatus illustrated in FIG. 2 may be an amplifier having an amplification factor variable above and below unity as described above. In FIG. 3, a circuit comprising switched capacitors may be substituted for the resistive divider of the level controller 23.

What is claimed is:

1. In a radio communication apparatus having a plurality of input terminals supplied with a plurality of input baseband signals and transmitting means connected to said input terminals for selectively transmitting said input baseband signals in response to a selection signal, said transmitting means comprising:

selecting means connected to said input terminals and responsive to said selection signal for selecting one of said input baseband signals as a single selected baseband signal;

level controlling means connected to receive said selected baseband signal and having a controllable gain and including means for controlling said selected baseband signal so that said selected baseband signal has a level which is determined by said controllable gain;

gain controlling means connected to said level controlling means and having a plurality of predetermined gains in correspondence to said input baseband signals and responsive to said selection signals for controlling said controllable gain so that said controllable gain becomes equal to one of said predetermined gains that corresponds to said selected baseband signal; and converting means connected to said level controlling means for converting said selected baseband signal into a radio signal which carries said selected baseband signal.

2. A radio communication apparatus as claimed in claim 1, wherein said gain controlling means comprises:

memorizing means for memorizing said predetermined gains;

reading means connected to said memorizing means and responsive to said selection signal for reading from said memorizing means, as a read-out gain, one of said predetermined gains that corresponds to said selected baseband signal; and means connected to said reading means and to said level controlling means for controlling said controllable gain so that said controllable gain becomes equal to said read-out gain.

3. A radio communication apparatus having a plurality of output terminals and comprising receiving means for receiving a radio signal and for selectively producing a plurality of output baseband signals at said output terminals, said receiving means comprising:

a converter for converting said radio signal to a plurality of processed baseband signals and a selection signal;

a level controller having a controllable gain and connected to said converter for controlling said processed baseband signals into level-controlled baseband signals, each of said level-controlled baseband signals having a level determined by said controllable gain;

gain controlling means connected to said level controller and having a plurality of predetermined gains in correspondence to said output baseband signals, said gain controlling means being effective for setting said controllable gain to a predetermined gain in response to said selection signal; and a selector connected to said level controller and having said output terminals for selecting one of said output terminals as a single selected terminal in response to said selection signal to supply said selected terminal with one of said level-controlled baseband signals having its level determined by said predetermined gain.

4. A radio communication apparatus as claimed in claim 3, wherein said gain controlling means comprises:

a memory for memorizing said plurality of predetermined gains;

a reading circuit connected to said memory and responsive to said selection signal for reading from said memory, as a read-out gain, one of said plurality of predetermined gains that corresponds to said one of the level-controlled baseband signals; and means connected to said level controller and said reading circuit for controlling said controllable gain so that said controllable gain becomes equal to said read-out gain.

* * * * *